US012625877B2

(12) United States Patent
Karabatis et al.

(10) Patent No.: US 12,625,877 B2
(45) Date of Patent: May 12, 2026

(54) SYSTEMS AND METHODS FOR ORGANIZING DATA OF DIFFERENT LOCAL DATA SCHEMAS BASED ON SIMILARITY RANKINGS, SCORING, AND SIGNATURES

(71) Applicant: University of Maryland, Baltimore County, Baltimore, MD (US)

(72) Inventors: George Karabatis, Ellicott City, MD (US); Andreas Behrend, Cologne (DE); Leonard Traeger, Baltimore, MD (US)

(73) Assignee: University of Maryland, Baltimore County, Baltimore, MD (US)

( * ) Notice: Subject to any disclaimer, the term of this patent is extended or adjusted under 35 U.S.C. 154(b) by 0 days.

(21) Appl. No.: 18/600,828

(22) Filed: Mar. 11, 2024

(65) Prior Publication Data
US 2024/0311389 A1 Sep. 19, 2024

Related U.S. Application Data

(60) Provisional application No. 63/451,068, filed on Mar. 9, 2023.

(51) Int. Cl.
*G06F 16/25* (2019.01)
*G06F 16/2458* (2019.01)
(52) U.S. Cl.
CPC ........ *G06F 16/258* (2019.01); *G06F 16/2471* (2019.01)
(58) Field of Classification Search
CPC ............................ G06F 16/258; G06F 16/2471
See application file for complete search history.

(56) References Cited

U.S. PATENT DOCUMENTS

| | | | |
|---|---|---|---|
| 2012/0158625 A1* | 6/2012 | Nelke .................... | G06N 5/025 706/59 |
| 2017/0235733 A1* | 8/2017 | Florance ........... | G06F 16/24578 707/765 |
| 2018/0260396 A1* | 9/2018 | Singh .................... | G06F 16/215 |

(Continued)

OTHER PUBLICATIONS

Koutras, Christos, et al., Valentine: Evaluating Matching Techniques for Dataset Discovery, 2021 IEEE 37th Conference in Data Engineering (ICDE), Deft Univ. of Technology, Aug. 8, 2023.

(Continued)

*Primary Examiner* — Aleksandr Kerzhner
*Assistant Examiner* — Aryan D Toughiry
(74) *Attorney, Agent, or Firm* — Olive Law Group, PLLC

(57) ABSTRACT

Systems and methods for organizing data of different local data schemas based on similarity rankings, scoring, and signatures are disclosed. According to an aspect, a system for identifying linkages among entities. The system also includes an entity linkage manager configured to analyze a concept for data schemas to determine similarity scores for entities of local data schemas with respect to entities of a global data schema. The entity linkage manager is also configured to map the entities of the local data schemas to the entities of the global data schema based on the determined similarity scores. Further, the entity linkage manager is configured to associate data within the at least one database based on the mapping for use in accessing related data.

16 Claims, 14 Drawing Sheets

(56)                     References Cited

U.S. PATENT DOCUMENTS

2023/0022673 A1 *   1/2023   Derzsy ................... G06N 5/022

OTHER PUBLICATIONS

Johnson, Jeff, et al., Billion-Scale Similarity Search with GPUs, IEEE Transactions on Big Data, vol. 7, No. 3, Jul.-Sep. 2021.

Ilyas, Ihab F., et al., Machine Learning and Data Cleaning: Which Serves the Other?, ACM Journal of Data and Information Quality, vol. 14, No. 3, Article 13, Jul. 2022.

Guo, Ruiqi, et al., Accelerating Large-Scale Inference with Anisotropic Vector Quantization, arXiv:1908.10396v5, Dec. 4, 2020.

Gong, Dong, et al., Memorizing Normality to Detect Anomaly: Memory-augmented Deep Autoencoder for Unsupervised Anomaly Detection, arXiv:1904.02639v2, Aug. 6, 2019.

Cappuzzo, Riccardo, et al., Creating Embeddings of Heterogeneous Relational Datasets for Data Integration Tasks, Association for Computing Machinery, SIGNMOD'20, Jun. 14-19, 2020.

Brunner, Ursin, et al., Entity Matching with Transformer Architectures—A Step Forward in Data Integration, Industry and Applications Paper, Proceedings of the 23rd International Conference on Extending Database Technology (EDBT), Mar. 30-Apr. 2, 2020.

Breunig, Markus, M., et al., LOF: Identifying Density-Based Local Outliers, ACM 2000, 2000.

Bank, Dor, et al., Autoencoders, arXiv:2003.05991v2, Apr. 3, 2021.

Azzalini, Fabio, et al., Blocking Techniques for Entity Linkage: A Semantics-Based Approach, Data Science and Engineering (2021) 6:20-38, Nov. 3, 2020.

Lerm, Stefan, et al., Extended Affinity Propagation Clustering for Multi-source Entity Resolution, Lecture Notes in Informatics (LNI), Gesellschaft fur Informatik, Bonn, 2021.

Papdakis, George, et al., Benchmarking Filtering Techniques for Entity Resolution, arXiv:2022.12521v5, Oct. 6, 2022.

Paulsen, Derek, et al., Sparkly: A Simple yet Surprisingly Strong TF/IDF Blocker for Entity Matching, Proceedings of the VLDB Endowment, vol. 16, No. 6, 2022.

Reimer, Nils, et al., Sentence-BERT: Sentence Embeddings using Siamese BERT-Networks, arXiv: 1908.10084v1, Aug. 27, 2019.

Ruff, Lukas, et al., A Unifying Review of Deep and Shallow Anomaly Detection, arXiv:2009.11732v3, Feb. 8, 2021.

Shlens, Jonathan, A Tutorial on Pricipal Component Analysis, zrXIv:1040.1100v1, Apr. 3, 2014.

Traeger, Leonard, et al., Inteplato: Generating Mappings of Heterogeneous Relational Schemas using Unsupervised Learning, 2022 International Conference on Computational Science and Computational Intelligence (CSCI), IEEE, 2022.

Zeakis, Alexandros, et al., Pre-trained Embeddings for Entity Resolution: An Experimental Analysis, Proceedings of the VLDB Endowment, vol. 16, No. 9, 2023.

Pennington, Jeffrey, et al., GloVe: Global Vectors for Word Representation, Proceedings of the 2014 Conference on Empirical Methods in Natural Language Processing (EMNLP) pp. 1532-1543, Oct. 25-29, 2014.

* cited by examiner

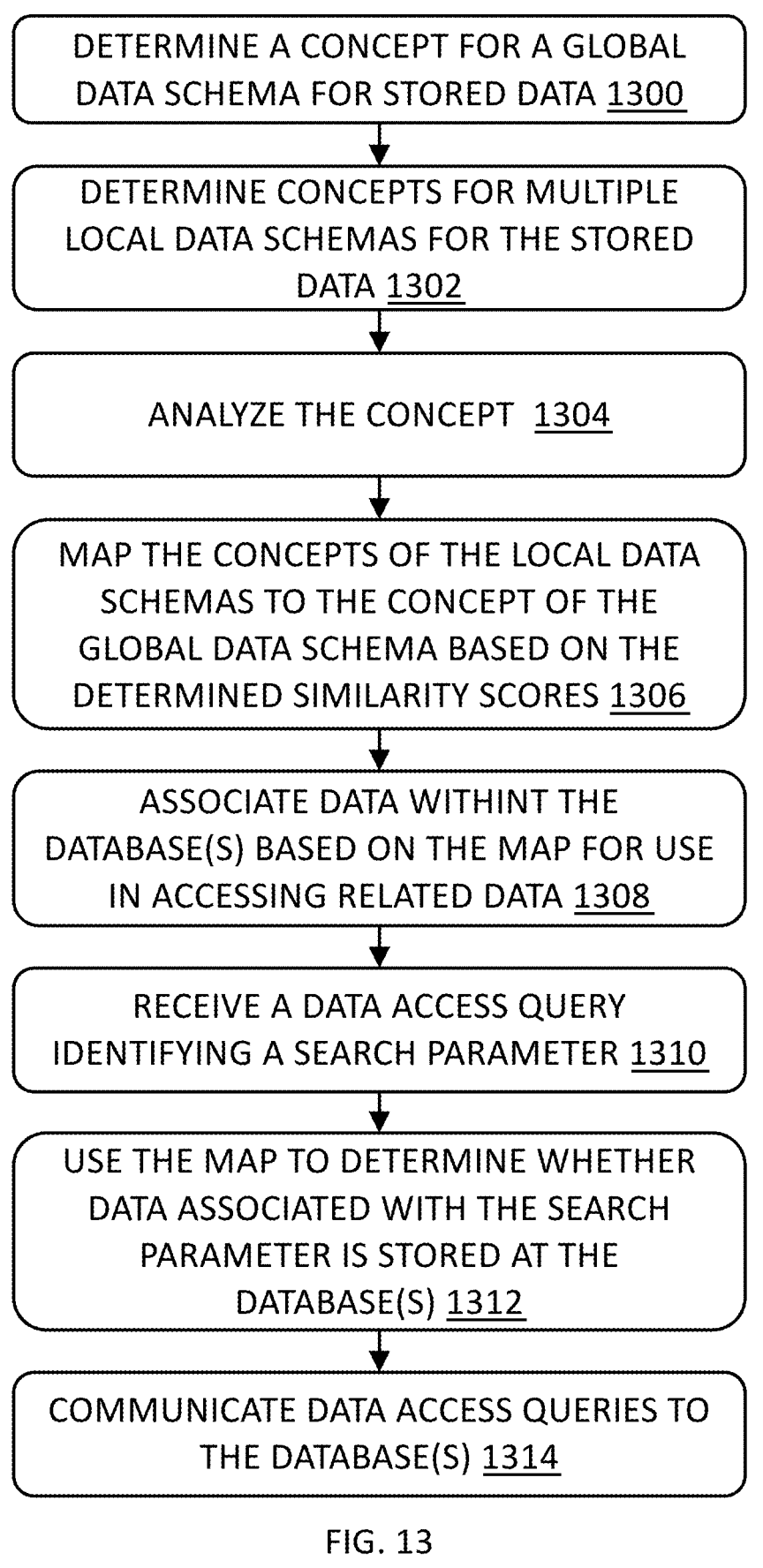

DETERMINE A CONCEPT FOR A GLOBAL DATA SCHEMA FOR STORED DATA <u>1300</u>

↓

DETERMINE CONCEPTS FOR MULTIPLE LOCAL DATA SCHEMAS FOR THE STORED DATA <u>1302</u>

↓

ANALYZE THE CONCEPT <u>1304</u>

↓

MAP THE CONCEPTS OF THE LOCAL DATA SCHEMAS TO THE CONCEPT OF THE GLOBAL DATA SCHEMA BASED ON THE DETERMINED SIMILARITY SCORES <u>1306</u>

↓

ASSOCIATE DATA WITHINT THE DATABASE(S) BASED ON THE MAP FOR USE IN ACCESSING RELATED DATA <u>1308</u>

↓

RECEIVE A DATA ACCESS QUERY IDENTIFYING A SEARCH PARAMETER <u>1310</u>

↓

USE THE MAP TO DETERMINE WHETHER DATA ASSOCIATED WITH THE SEARCH PARAMETER IS STORED AT THE DATABASE(S) <u>1312</u>

↓

COMMUNICATE DATA ACCESS QUERIES TO THE DATABASE(S) <u>1314</u>

FIG. 13

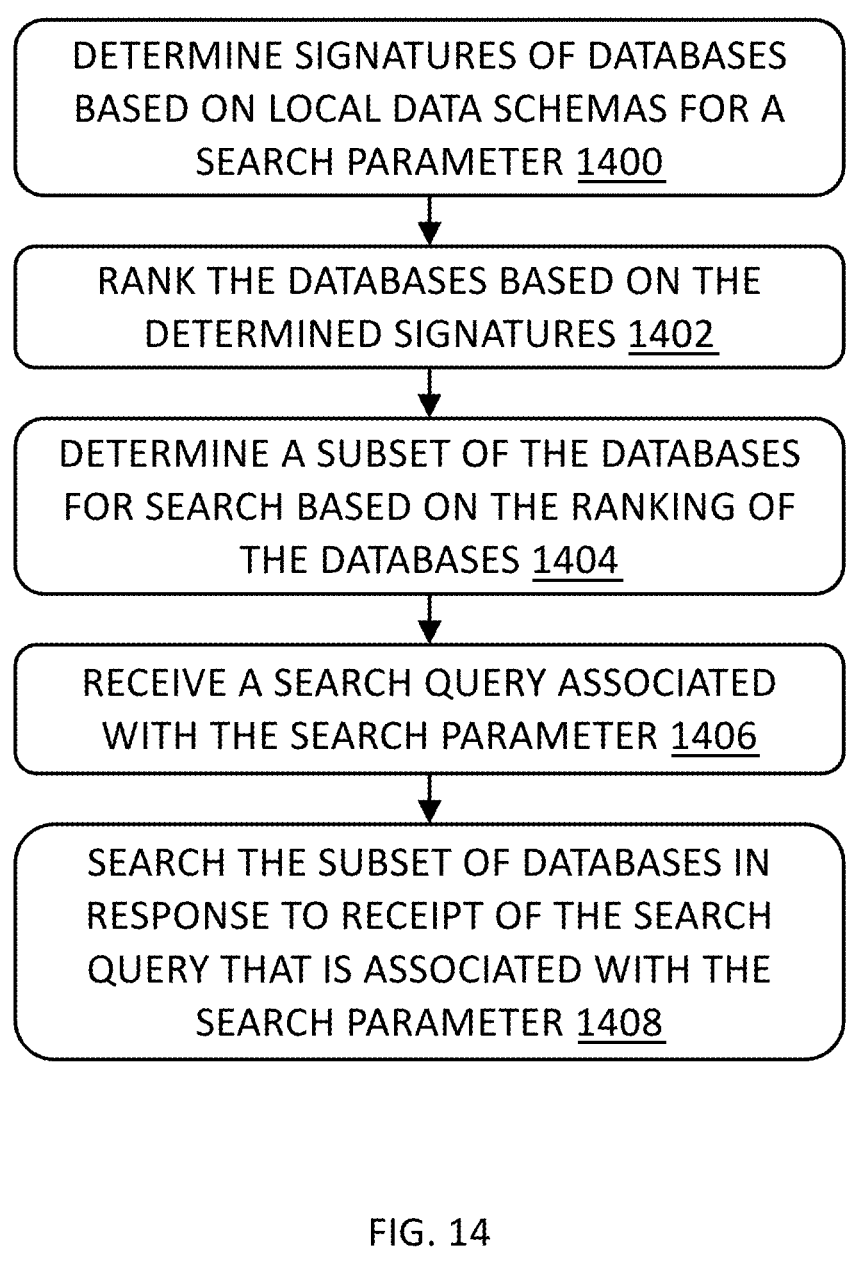

DETERMINE SIGNATURES OF DATABASES BASED ON LOCAL DATA SCHEMAS FOR A SEARCH PARAMETER 1400

RANK THE DATABASES BASED ON THE DETERMINED SIGNATURES 1402

DETERMINE A SUBSET OF THE DATABASES FOR SEARCH BASED ON THE RANKING OF THE DATABASES 1404

RECEIVE A SEARCH QUERY ASSOCIATED WITH THE SEARCH PARAMETER 1406

SEARCH THE SUBSET OF DATABASES IN RESPONSE TO RECEIPT OF THE SEARCH QUERY THAT IS ASSOCIATED WITH THE SEARCH PARAMETER 1408

FIG. 14

SYSTEMS AND METHODS FOR ORGANIZING DATA OF DIFFERENT LOCAL DATA SCHEMAS BASED ON SIMILARITY RANKINGS, SCORING, AND SIGNATURES

CROSS REFERENCE TO RELATED APPLICATION

This application claims priority to U.S. Provisional Patent Application No. 63/451,068, filed Mar. 9, 2023, and titled "Systems and Methods of Generating Mappings of Heterogeneous Relational Schemas Using Unsupervised Learning", the content of which is incorporated herein by reference in its entirety.

TECHNICAL FIELD

The presently disclosed subject matter relates generally to data management and analysis systems. Particularly, the presently disclosed subject matter relates to systems and method for organizing data of different local data schemas based on similarity rankings, scoring, and signatures.

BACKGROUND

Large organizations typically have access to large datasets from various sources. Data management and analysis systems can assist people with organizing, accessing, and sorting through such data. However, as time passes the data sets usually grow in size, and therefore it becomes increasingly difficult to make use of it. As a result, there is an increasing interest in mastering the data of an organization and, also, enriching it with external information, thus improving reporting capabilities and knowledge extraction. Human labor can manually export and import external data up to a practical limit. On the other hand, a sustainable consolidation of heterogeneous databases becomes time-consuming and may even lead to failures due to complexity. The "Data Discovery Problem" summarizes how exponential growth of data, desire to consolidate data domain independently, heterogeneous schema architectures, unstructured, unclean and incomplete data, and limited resources of domain and information technology (IT) knowledge form the need for heterogeneous database resolution.

To reduce the complexity of $O(N^N)$ when consolidating multiple databases with each other, the approach of a mediating global schema serves to abstract, map, and simplify mappings to $O(2N)$ between local heterogeneous databases and schemas. However, the use of Machine Learning to automate mappings between a global concept, for instance, "Customers" with table "Customer" in schema A and table "Client" in schema B is not fully exploited. An increasing number of approaches describe how machine learning techniques and similarity measures between database concepts can enhance Data Integration (DI) and how both disciplines function together in a "natural synergy" to create a "large homogeneous collection of data".

DI systems aim to reach a complete, concise, and consistent homogeneous database state. A key prerequisite to the construction of a DI system is the process of entity resolution or matching, data matching, and record linkage. The research community contributed with applications of machine learning algorithms, but without schema mapping in their scope. In the real world, schema mapping remains "an unavoidable problem" for its downstream phases within a DI pipeline. Nonetheless, schema mapping is often treated completely independently and handcrafted manually during the preprocessing step for machine learning pipelines.

There is a continuing need for improved techniques for entity resolution within large collections of data across databases. Particularly, there is a need for reducing the processing burden and other costs with searching large and different databases towards identification and verification of true entity linkages.

BRIEF DESCRIPTION OF THE DRAWINGS

Figure 1:
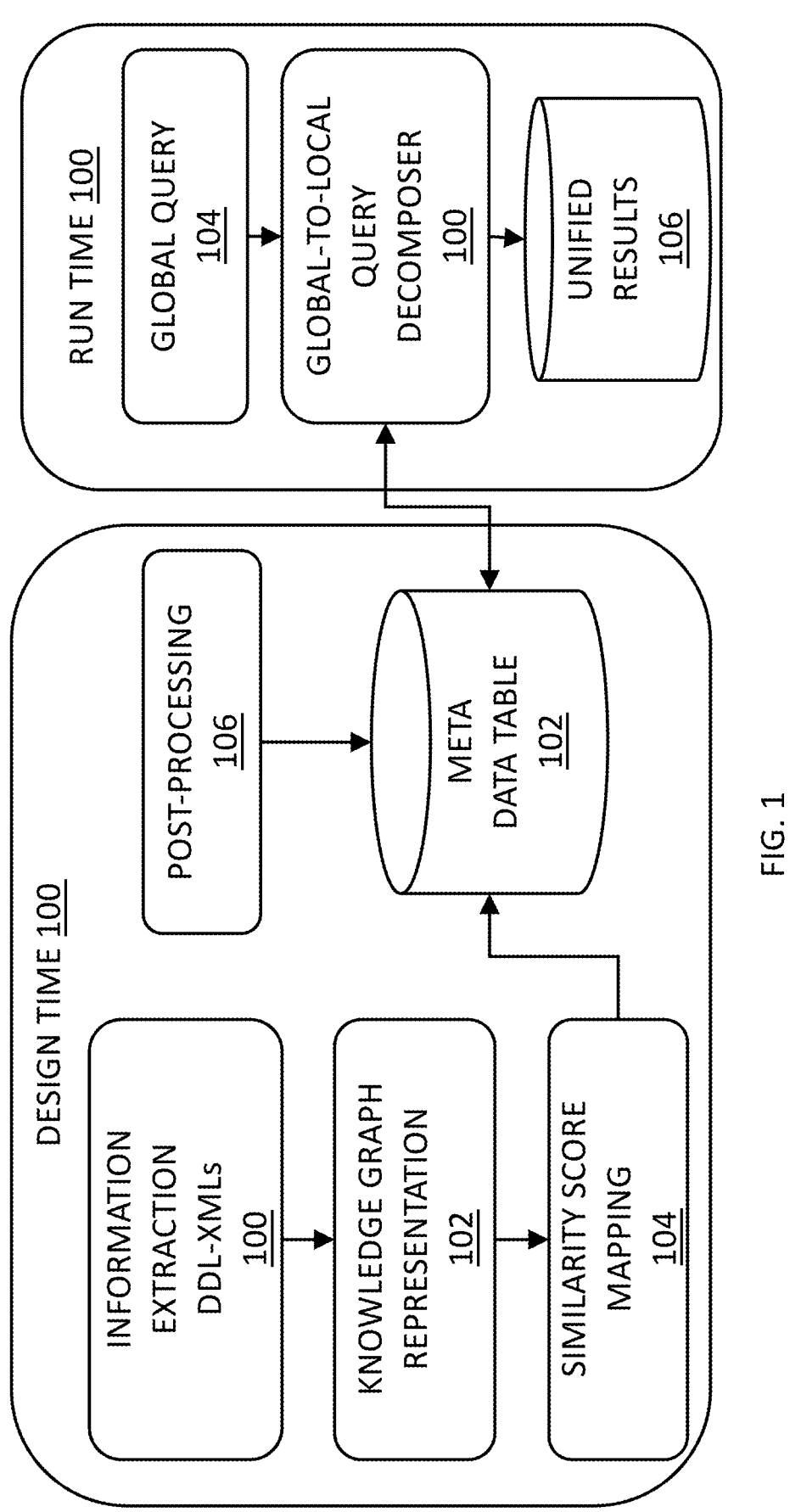
Figure 2:
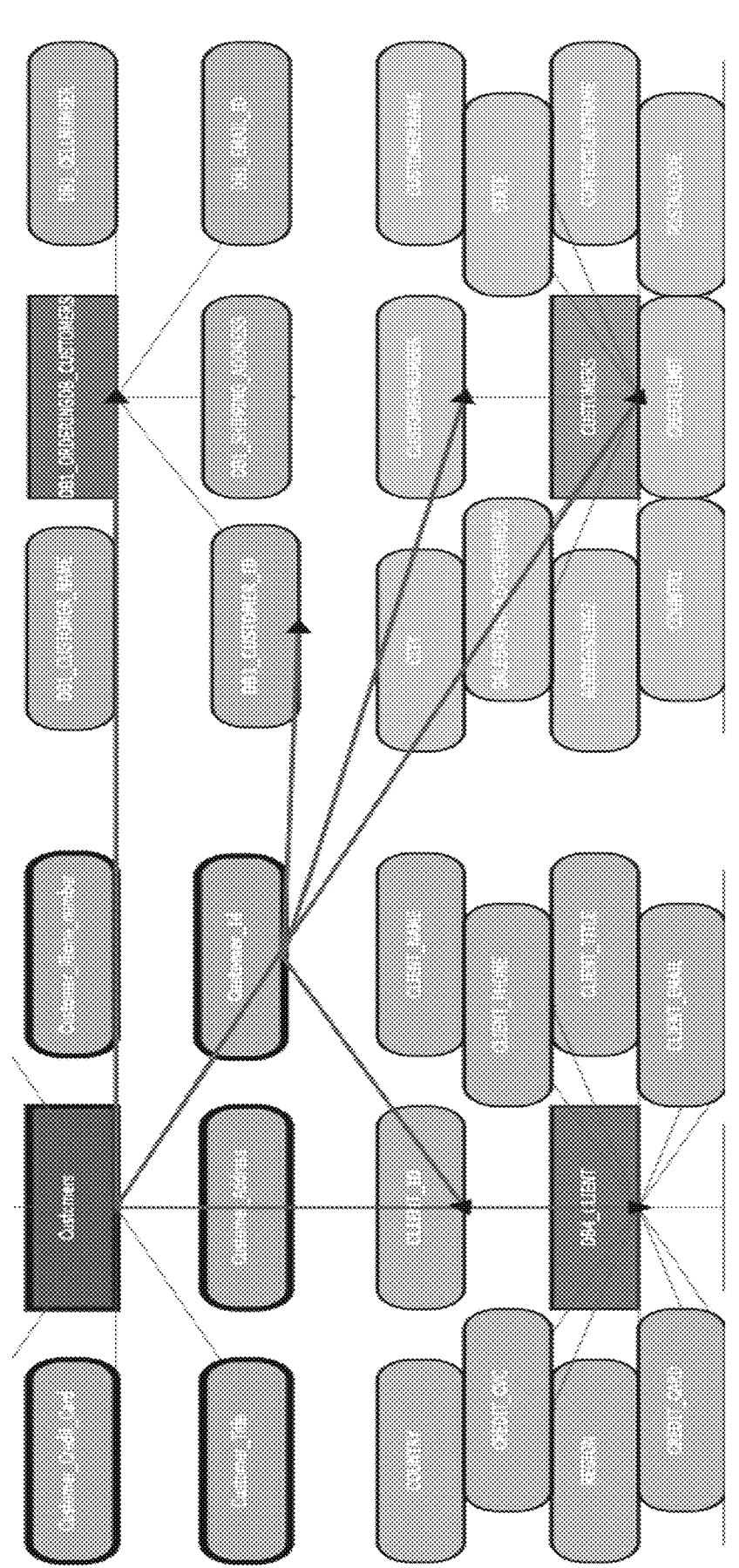
Figure 4:
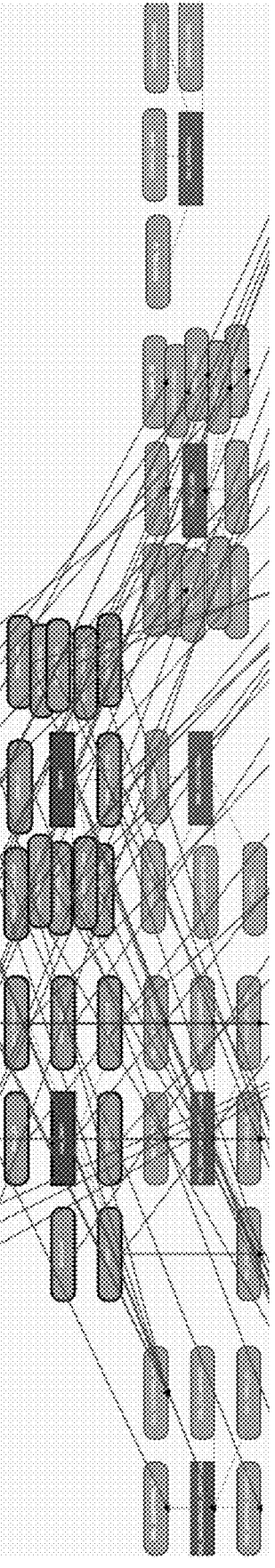
Figure 5:
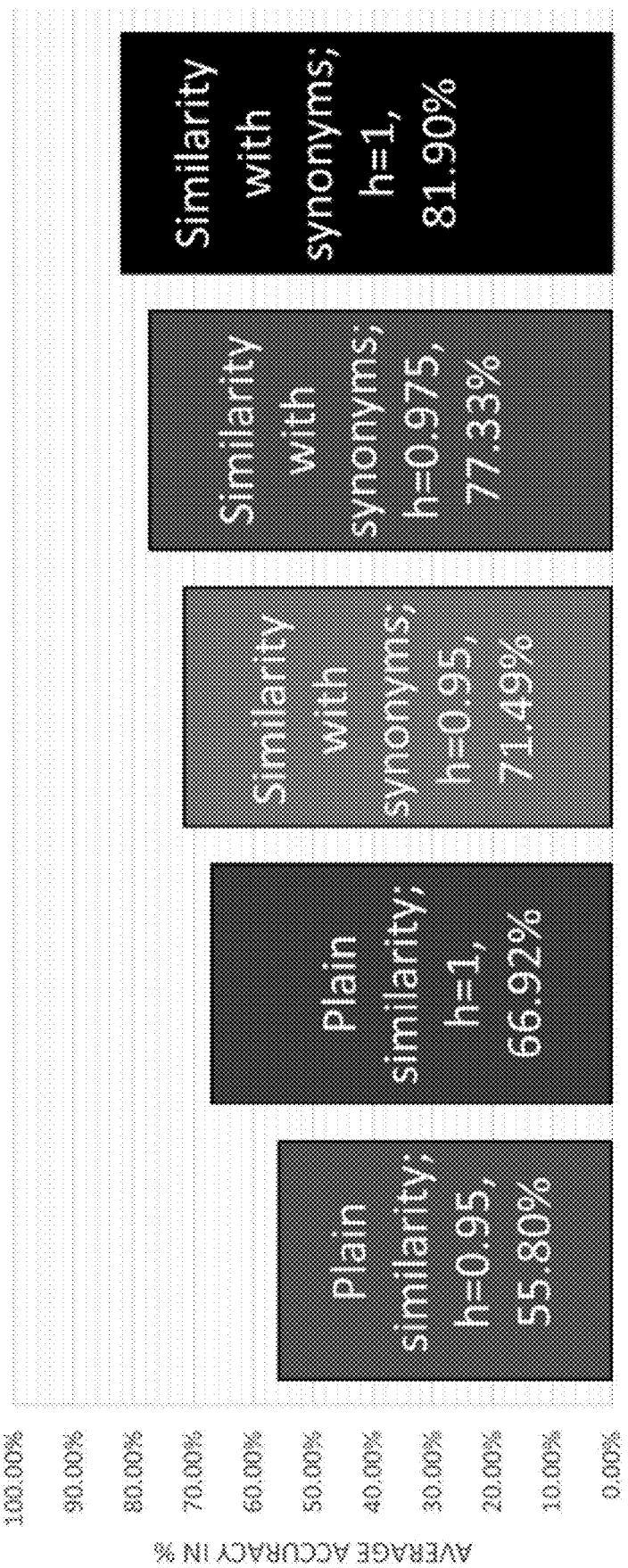
Figure 6:
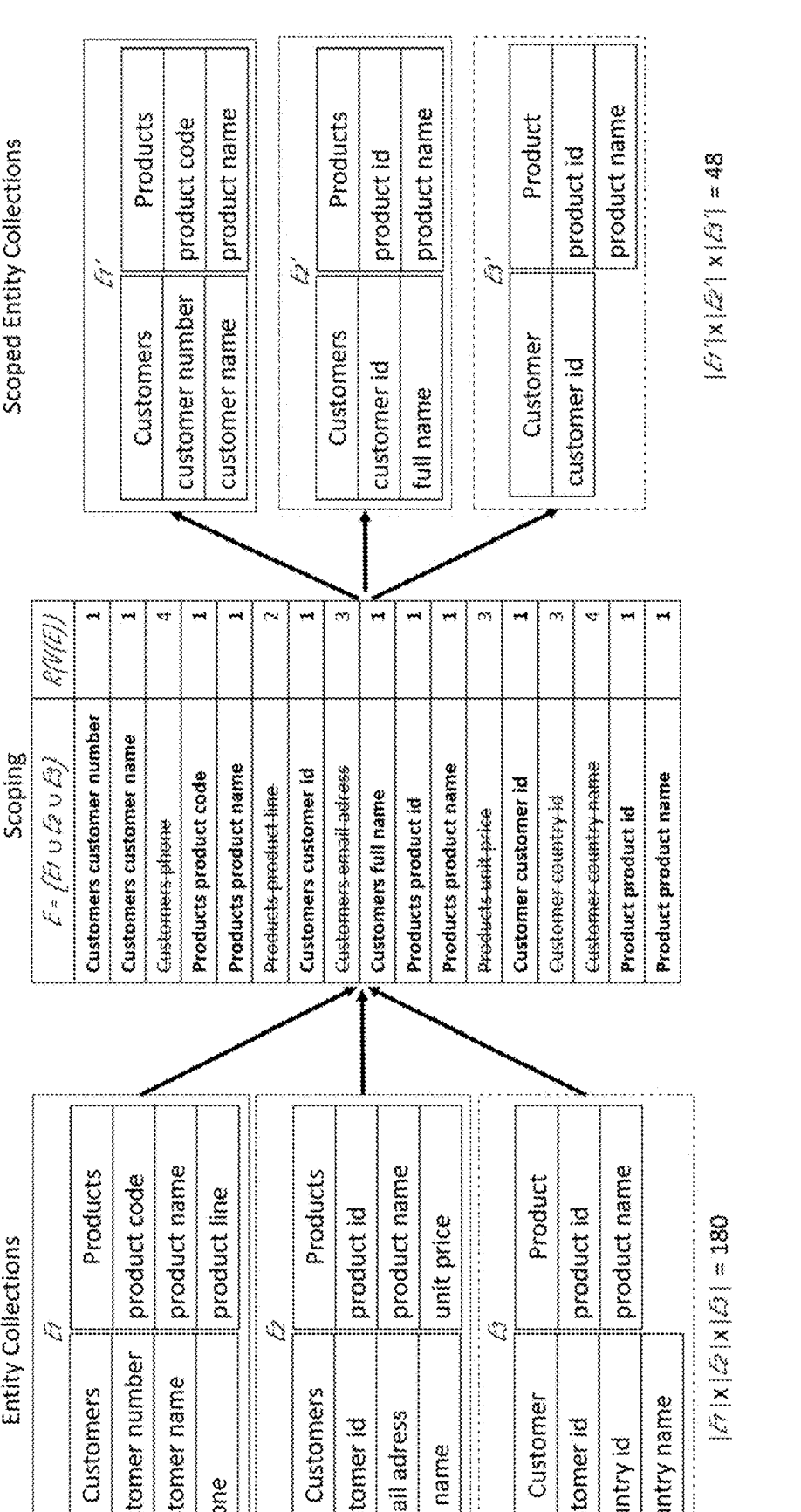
Figure 7:
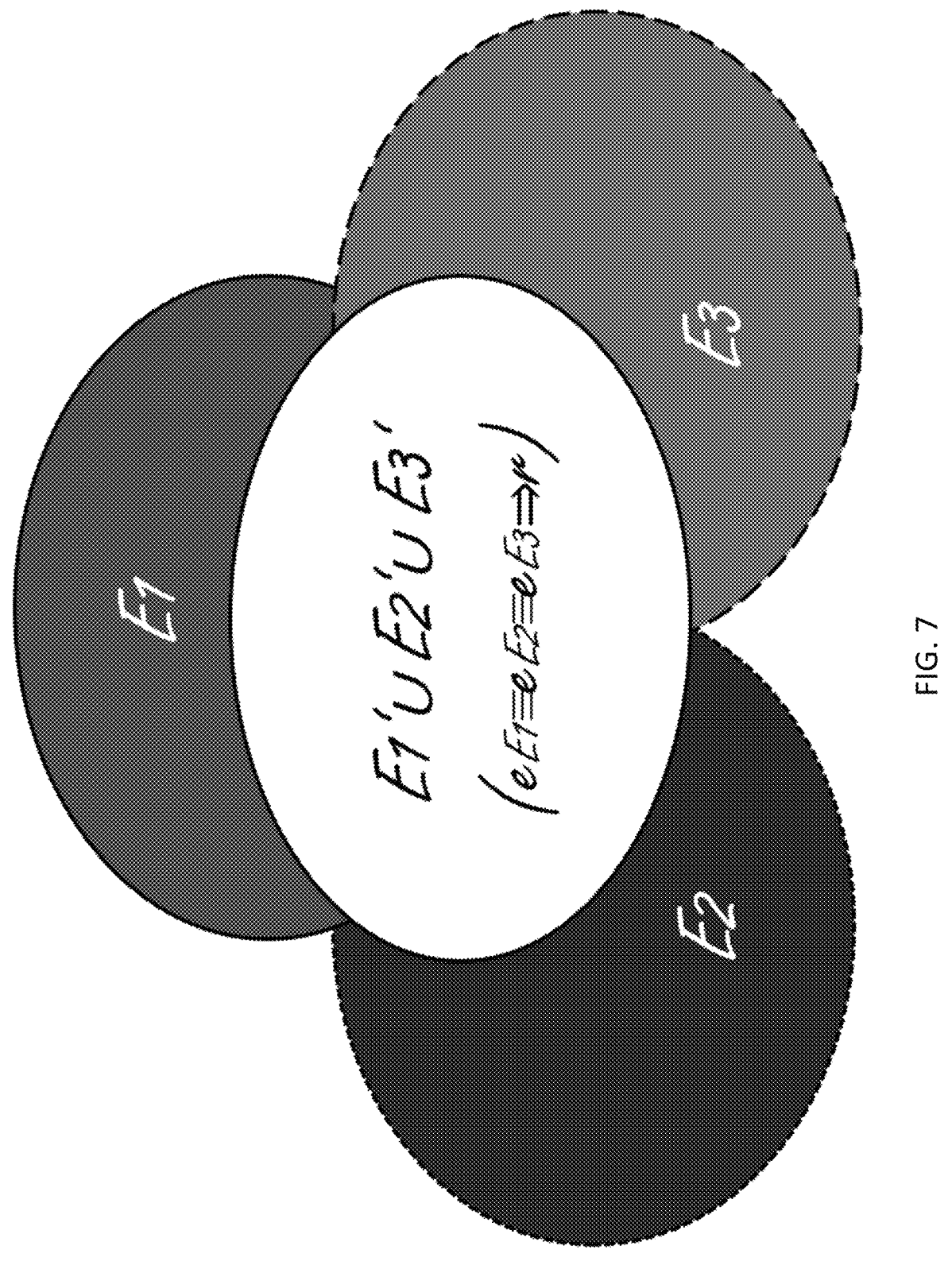
Figure 8:
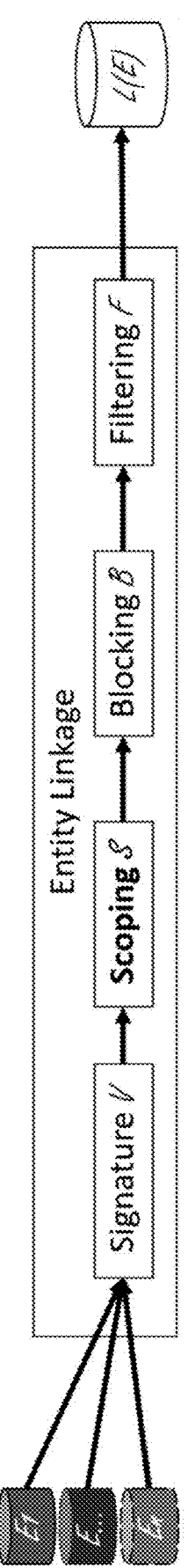
Figure 9:
Figure 10:
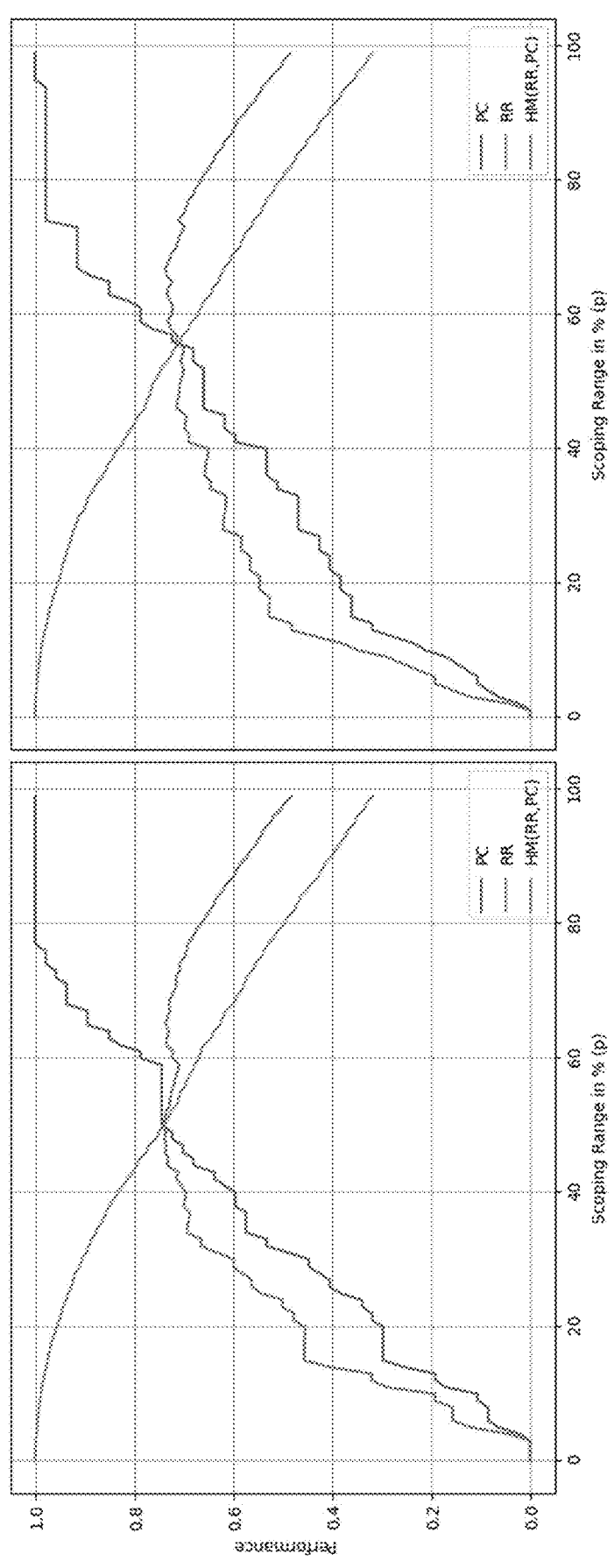
Figure 11:
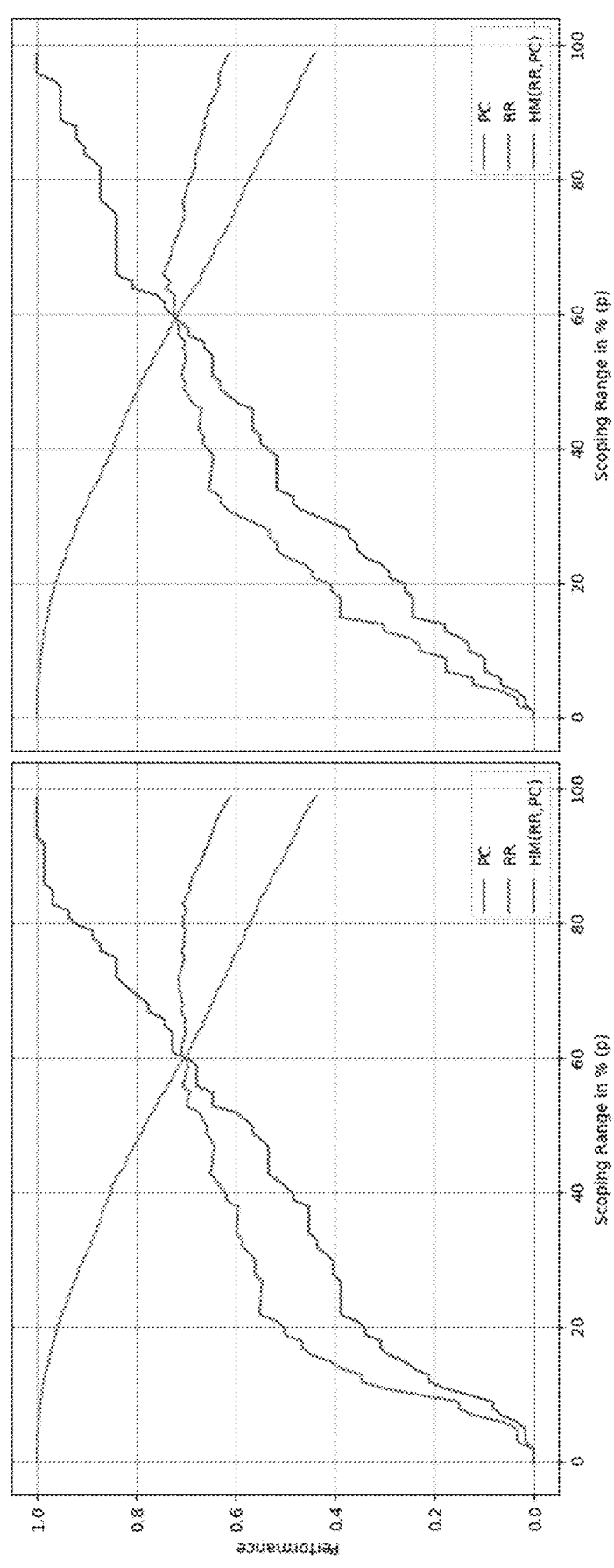
Figure 12:
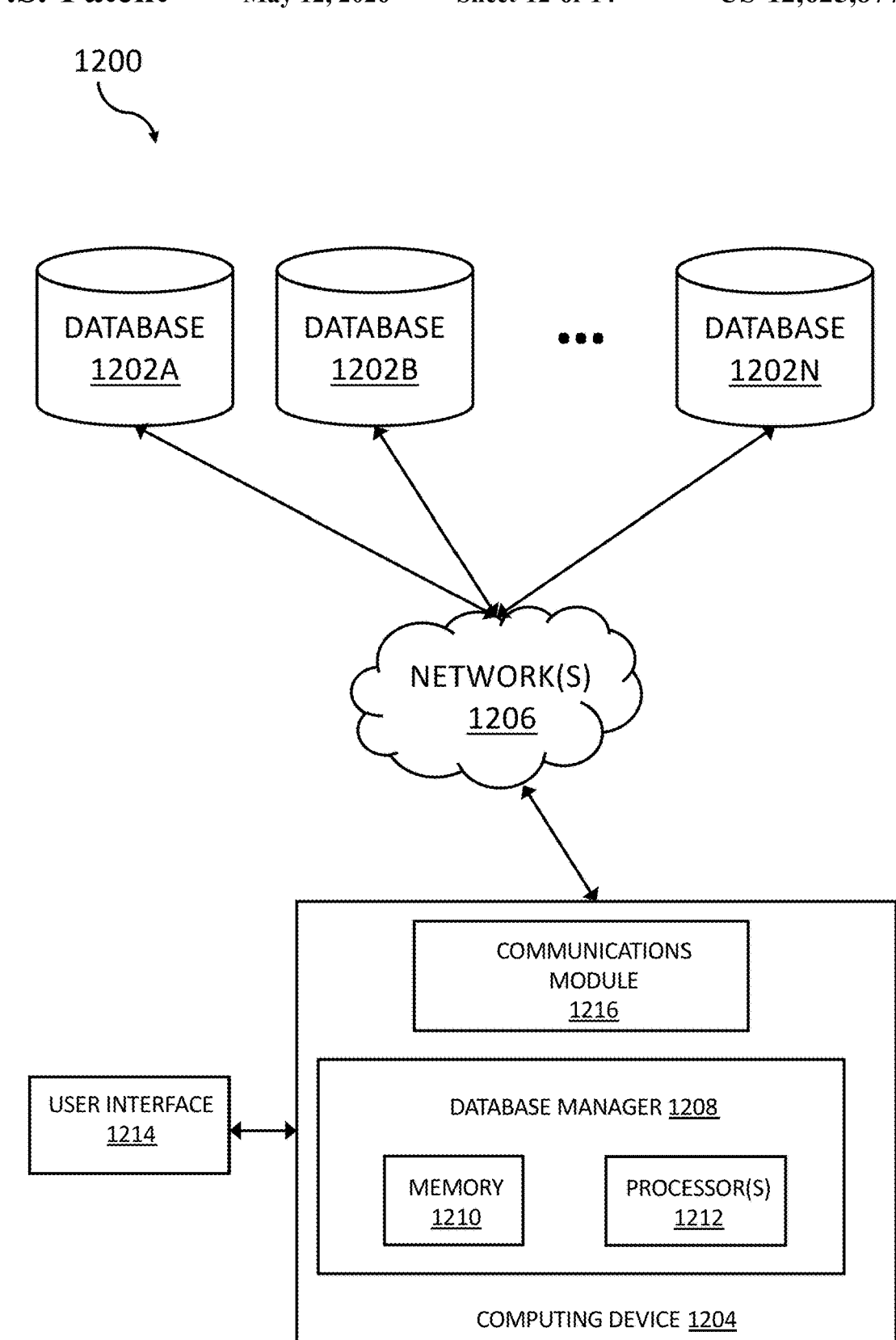

Having thus described the presently disclosed subject matter in general terms, reference will now be made to the accompanying Drawings, which are not necessarily drawn to scale, and wherein:

FIG. 1 is a diagram of modules of an example architecture, split into design and run time in accordance with embodiments of the present disclosure;

FIG. 2 is a diagram depicting a Knowledge Graph, which may be visualized in accordance with embodiments of the present disclosure;

Figure 3:
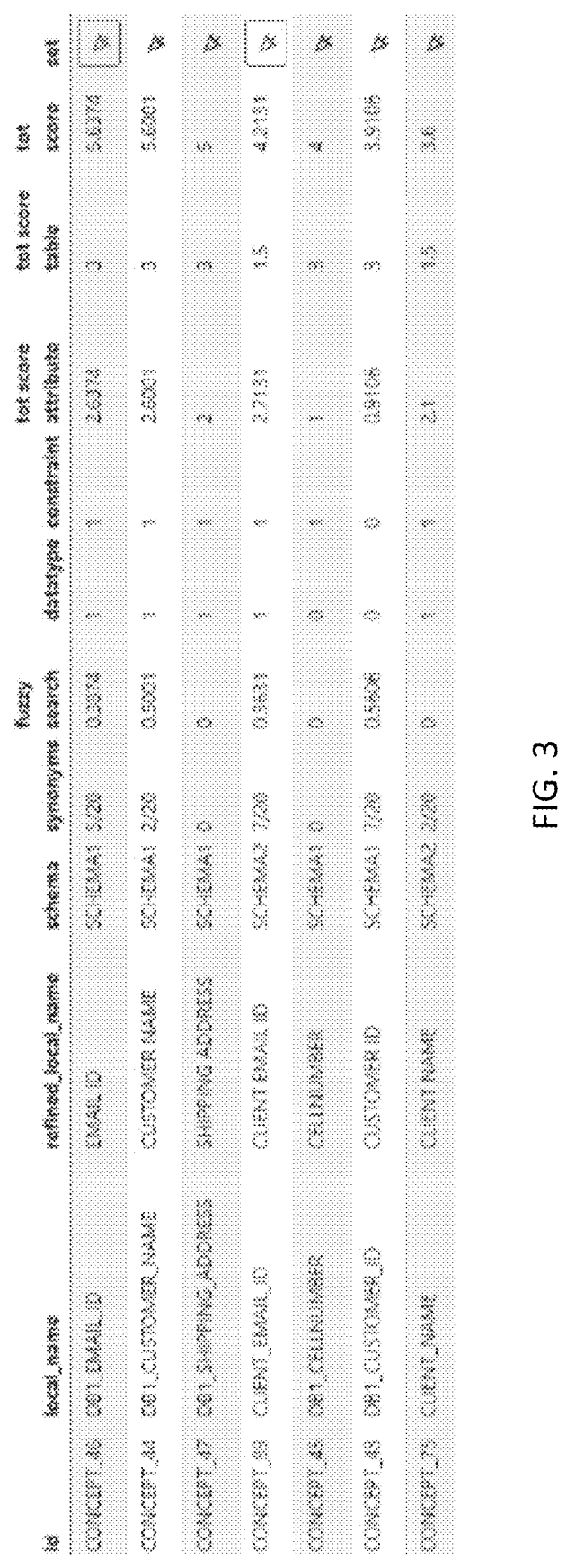

FIG. 3 depicts a table showing mapping for global attribute Customer Mail Id using total score for N ranked local attribute concepts;

FIG. 4 represents a knowledge graph of the global and the two local schemas and their automated mappings;

FIG. 5 is a graph that shows an overview of the accuracy of example mappings generated by systems disclosed herein in comparison to the experts' mappings;

FIG. 6 depicts an excerpt of a multi-sourced Entity Linkage problem between three entity collections sampled from three schemas of database vendors Oracle (E1), MySQL (E2), and SAP HANA (E3), storing data about customers and products;

FIG. 7 is the increasing heterogeneity represented by the colored entity collections represented as ovals with unlinkable entities, while the linked ones are shown in the white overlapping oval;

FIG. 8 is a diagram showing entity linkage workflow with scoping in accordance with embodiments of the present disclosure;

FIG. 9 is a diagram showing an agent for entity ranking in scoping in accordance with embodiments of the present disclosure;

FIGS. 10 and 11 plot the best performing stand-alone and ensemble configurations for APC and AHM with the performance (y-axis) of the time reduction ratio, pair completeness, and the harmonic mean on the increasing relative threshold parameter p (x-axis);

FIG. 12 is a block diagram of an example system for organizing data of a plurality of different databases having different local data schemas in accordance with embodiments of the present disclosure;

FIG. 13 is a flow diagram of an example method for organizing data of different schemas and for utilizing the organized data in accordance with embodiments of the present disclosure; and FIG. 14 is a flow diagram of another example method for organizing data of different schemas and for utilizing the organized data in accordance with embodiments of the present disclosure.

SUMMARY

The presently disclosed subject matter relates to systems and methods for identifying entity linkages of different data schemas based on similarity rankings, scoring, and signatures. An entity linkage (EL) manager is also configured to analyze the concepts for the local data schemas to determine similarity scores towards identification of linkages with respect to the concept of the global data schema. Further, the entity linkage manager is configured to map the concepts of the local data schemas to the concept of the global data schema based on the determined similarity scores. The entity linkage manager is also configured to associate data within the at least one database based on the map for use in accessing related data.

The entity linkage manager is configured to determine signatures of the entities based on the local data schemas. Further, the entity linkage manager is configured to rank the entities based on the determined signatures. Integrating entities from multiple sources leads to the identification of several entities that have no actual linkages with each other. These entities may not be or may be prevented from being linked at all. Existing methods do not consider this as an explicit phase and result in linkages that not always reflect reality. Scoping, a major part of the entity linkage manager reduces the search space of potential linkages to a much smaller one, while at the same time maintains the majority of the verified linkages.

According to an aspect, a system for identifying linkages among entities. The system also includes an entity linkage manager configured to analyze a concept for data schemas to determine similarity scores for entities of local data schemas with respect to entities of a global data schema. The entity linkage manager is also configured to map the entities of the local data schemas to the entities of the global data schema based on the determined similarity scores. Further, the entity linkage manager is configured to associate data within the at least one database based on the mapping for use in accessing related data.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Unless otherwise defined, all technical terms used herein have the same meaning as commonly understood by one of ordinary skill in the art to which this disclosure belongs.

In accordance with embodiments, the present disclosure provides improved techniques with regarding to the schema mapping phase and presents an unsupervised highest concept score with schemata similarity measures to support DI. Example features of these techniques include, but are not limited to:

Graph visualization of schema concepts;

Creation of concept clusters based on similarity; and

Automated global to local mapping generation.

Architectures and modules of automated and user-centric schema mapping systems are disclosed herein. These systems can generate mappings between global and local data schemas. A data schema (also referred to as a "database schema") can define how data is organized within a relational database. Further, the data schema can refer to the logical and visual configuration of a relational databased. As an example, database objects can be grouped and displayed as tables, functions, and relations. A data schema can indicate the organization and storage of data in a database and define relationships between various tables.

In accordance with embodiments, systems disclosed herein can generate clusters of similar concepts. These clusters are potential candidates for a mapping between global and local concepts. Since all concepts in a local database can include a local data schema, the systems disclosed herein can automatically map N local data schemas to a global data schema. In the absence of a global data schema, a local data schema can be assigned as a global data schema.

FIG. 1 illustrates a diagram of modules of an example architecture, split into design and run time in accordance with embodiments of the present disclosure. The modules depicted in FIG. 1 may be implemented by one or more computing devices as will be understood by one of skill in the art. Referring to FIG. 1, the design time 100 of the architecture can evolve around a meta data table 102, which can store the mappings between concepts from a global data schema to each of N local data schema concepts. In an example, a global query 104 may be submitted to the system. In response to submission of the global query 104, the system references the meta data table 102 to use the stored mappings to the local systems in order to automatically generate local queries to be submitted to the underlying local database for execution, collect the local results, process it, and deliver it to a global user.

With continuing reference to FIG. 1, a DDL database schema can be extracted via XML. The system can parse the DDL-XML files generating a scheme objects stored as records in a relational table, referred to herein as a ConceptList (ID, Name, Parent ID, Data Type, Constraint), where ID is a concept's identifier, Name stores the concept name, Parent ID is the ID of the parent table (for attributes) or the schema ID (for tables) and Constraint, which stored the actual constraint, e.g., primary or foreign key constraint. The ConceptList stores the concepts of all local and global schemas. FIG. 2 illustrates a diagram depicting a Knowledge Graph, which may be visualized in accordance with embodiments of the present disclosure.

Table I below shows an example meta data table with example data.

TABLE I

| Global Concept | Scheme 1 | . . . | Schema N |
|---|---|---|---|
| CUSTOMER CUSTOMERNAME | CLIENT NAME | . . . NAME | CUSTOMERS CNAME |
| . . . | . . . | . . . | . . . |

With continuing reference to FIG. 1, the system can visualize the schemas where tables are squares, attributes are ovals, primary keys are bold, and foreign keys are italics. Edges from global (increased stroke-width) to local concepts signify a mapping and can be automatically derived by the unsupervised machine learning algorithm described below. A person can operate a suitable computer user interface to review and edit these mappings if needed, using the visual knowledge graph.

In accordance with embodiments, system disclosed herein can utilized similarity functions for analyzing each local subsystem and finding a similarity between a local and a global concept. Systems disclosed herein can measure how close a global concept is to several local concepts. One approach of system disclosed herein is highlighted by the fact that the similarity between global to local attribute concepts incorporates also the similarity score of their parent tables. In addition, the similarity score between a global to a local table concept includes the similarity of its children attributes. Some similarity functions can be applied to both tables and attributes, while others only to tables, or only to attributes. Similarity functions are always between a global concept and one or more local concepts. In order for systems disclosed herein to identify such a mapping, it calls a similarity function based on a single global concept to identify the corresponding mappings with all local concepts. These similarity functions may always compare concepts of the same granularity, i.e., table to table, or attribute to attribute.

In examples, each similarity function returns as output a two-tuple (local concept id, similarity score) where concept id is a system generated identifier, and the similarity score is the value of the similarity between a global concept and a local concept. This forms the basis for generating clusters of potential mappings to a global concept. In essence, a cluster of local concepts can be identified by examining all two-tuples and extracting those with the same local concept id. These clusters can be generated for either tables or attributes. Table II summarizes the different similarity functions, explained next.

One function that systems disclosed herein can implement is a "Fuzzy Search" function. This function returns a similarity match of two strings. Systems disclosed herein can compares table or attribute names such as the strings CUSTOMER and CUSTOMERS and can return their string similarity in the range [0 . . . 1]. It is built upon the Fuse JavaScript library and represented next:

$$fuzzyScore(globalConcept)=(conceptID_i,Score_{concept_i}) \quad (1)$$
$$\forall i \in localConcepts$$

Another function implemented by systems disclosed herein is referred to as "Synonyms Retrieval and Intersection". Regarding this function, it is noted that string similarity by itself does not yield satisfactory results when the global to local schema mapping involves labeling conflicts. Usually, similar concepts may be labeled using different names for table and attribute names. To overcome this, systems disclosed herein can utilize a suitable API (e.g., the publicly available API known as WordsAPI (www.word-sapi.com)) to retrieve a set of synonyms for each concept name, such as CUSTOMER with synonyms {CLIENT, CUSTOMERS}. In a subsequent step, a similarity function can evaluate synonym intersections of global to local concepts of the same type. Since some APIs cannot retrieve synonyms for names with schema specifications, e.g., a DB1_ prefix, this function can utilize a rule-based pre-processing of the table and attribute names. Furthermore, rules replacing specific characters such as the "_" with blanks are easily implemented in systems disclosed herein to simplify the name manipulation for successful synonym retrieval replaceAll("_", " ").

Yet another function implemented by systems disclosed herein is referred to as "Attribute Property Similarities". In addition to identifying similarities based on names, systems disclosed herein can contain other similarity functions, based on properties of attributes such as comparing the datatypes (c1) between a global and local attribute; similarly for integrity constraints (c2). A primary reason is that such properties that co-exist in parallel between global and local schemas may need to be identified, revealed, and reflected in the similarity score. These functions based on attribute properties may include the similarity score of the parent table shown in (c4). For example, the global attribute NAME in table CUSTOMER has a higher similarity score with the local attribute NAME in table CLIENT as opposed to local attribute NAME in table PRODUCT.

The datatype similarity (c1) can be calculated between global and local attributes. If the datatype of a global attribute is the same as a local attribute datatype, 1 is returned, and 0 if not. The datatype similarity can be enhanced by setting up a mixed-membership dictionary of compatible datatypes. The constraint similarity (c2) between two concepts can look for the existence of the same constraint type between a global and a] local concept and returns 1 if found, 0 if not. The attribute score (c3) can be generated using Algorithm 1, which is set forth below. Algorithm 1 sums all similarity two-tuples returned by fuzzy score, synonyms intersection, datatype similarity, and constraint similarity, per cluster.

More precisely, Algorithm 1 describes the generation of all clusters. It works on all two-tuples and performs a UNION and a GROUP BY on the local concept ID. Each group generated corresponds to a cluster of similar local concepts to a global concept. For each generated cluster, the algorithm performs a SUM operation adding the individual similarity scores and generating the attribute score.

TABLE II

| # | Similarity Function | Attribute | Table |
|---|---|---|---|
| a | Fuzzy search score | √ | √ |
| b | Synonyms retrieval & intersection | √ | |
| c1 | Datatype similarity score | √ | |
| c2 | Constraint similarity score | √ | |
| c3 | Attribute score | $a \oplus b \oplus c1 \oplus c2$ | |
| c4 | Attribute with parent table score | d1 | |
| c5 | Table score | $c3 \oplus c4$ | |
| d1 | Table with attribute children score | | $a \oplus$ |
| d2 | Table with attribute children score | | $\Sigma max(c3)$ |
| d3 | Total table score | | $d1 \oplus d2$ |

Algorithm 1 ⊕ Generating Similarity Clusters

```
Require: st1, st2 --similarity two-tuples
    --with object structure (conceptID, similarity score)
1:      let union = st1.concat(st2); --UNION
2:      let distinctIDs = new Array;
3:      let setOfClusters = new Array:
4:      for all concept in union do
5:          if conceptID not in distinctIDs then
6:              distinctIDs.push(conceptID); --DISTINCT
7:          end if
8:      end for
9:      for all dConceptID in distinctIDs do
10:         let cluster = new Object;
11:         for all concept in union
                where conceptID = dConceptID do
12:             cluster.addScore(concept); --SUM
13:         end for
14:         setOfClusters.push(cluster);
```

-continued

| Algorithm 1 ⊕ Generating Similarity Clusters |
| --- |
| 15:     end for |
| 16:     return setOfClusters with SUM of similarity scores |

Subsequently, systems disclosed herein can determine an attribute with parent table score. Particularly, assuming (c4) that all similarity scores for tables have been calculated, systems disclosed herein can generate the attribute with parent table score. In an example, the attribute with parent table score can be generated as follows: for each local attribute with a similarity score, the similarity score of its parent table (d1) is added to find the max similarity. For example, a global attribute NAME in table PRODUCT has higher similarity to a local attribute NAME in table INVENTORY as opposed to another local attribute NAME in table CUSTOMER.

Subsequently, the total attribute score (c5) can be calculated by summing the similarity two-tuples of the attribute score and the attribute with parent table score, using Algorithm 1. Systems disclosed herein can use the above similarity functions to identify the best mapping for each global attribute concept (e.g., attribute CUSTOMER_MAIL_ID) by executing each attribute similarity function and calculating the total attribute score.

Then, all local attribute similarity scores are shown in descending order in a list (see the example of FIG. 3) of all potentially matching local attribute concepts. The local attribute with the highest similarity score of one local schema is deemed to be the best mapped local attribute to the global one.

Another function implemented by systems disclosed herein includes determining "Table Property Similarities". Similar to the attribute score, the table score (d1) function sums the two similarity two-tuples resulting from fuzzy score and synonym intersection functions. This can be implemented by use of Algorithm 1.

The table with attribute children score (d2) includes the attribute similarity scores of local tables with the global table's attributes. In this case, the assumption is that the highest matching score between all global attributes compared to local attributes (c3) is added to the score of the corresponding global table to local table mapping. This is repeated for each attribute of a global table concept. For example, the global table PRODUCTS (with attributes PRODUCT_ID, PRODUCT_NAME, and ORDER_ID) has a higher similarity score with the local table ITEMS (with attributes ITEM_ID, ITEM_NAME, and ORDER_ID) as compared to local table ORDERS (with attributes ORDER_ID, ITEM_ID, ORDER_PRICE).

The result of the table with attribute children score can increase unproportionally due to the fact that while attributes have exactly one parent table, tables usually have more than one attribute that adds to the score. Therefore, the table with attribute children score is normalized in the range [0 . . . 1] per schema.

The total table score (d3) can sum the result tuples of the individual table score based on the output of Algorithm 1 and can add it to the normalized table attribute children score.

Another function implemented by systems disclosed herein includes generating semantic mappings. A main goal is to use the generated clusters and automatically create mappings from global to local concepts that are stored in the Metadata Table. Algorithm 2 can map the highest local concept score within the same cluster (using similarity functions) to each global concept. Once a local concept is mapped, it is inserted into the Metadata Table.

In some scenarios, systems disclosed herein may need to implement an additional function if it cannot differentiate among the top ranked local concepts when they all have the same highest similarity score within one cluster. In such scenarios, systems disclosed herein can insert a NULL value in the Metadata Table to indicate that no such mapping exists [Alg. 2, line 12].

| Algorithm 2 Highest local concept mapper |
| --- |
| Require: ath {ambiguity tolerance (0..1) hyperparameter} |
| 1:     let lc = new Array, {local clusters} |
| 2:     for all globalConcept in ConceptList do |
| 3:         for all localSchema do |
| 4:             if globalConcept is table then |
| 5:                 lc =totalTableScore(globalConcept); |
| 6:             end if |
| 7:             if globalConcept is attribute then |
| 8:                 lc = totalAttributeScore(globalConcept); |
| 9:             end if |
| 10:             if lc[1] / lc[0] < ath then |
| 11:                 globalConcept.map(lc|0|); |
| 12:             else |
| 13:                 globalConcept.map(NULL); |
| 14:             end if |
| 15:         end for |
| 16:     end for |
| 17:     return Metadata Table; |

FIG. 3 depicts a table showing mapping for global attribute Customer Mail Id using total score for N ranked local attribute concepts.

In addition, systems disclosed herein can utilize a regularizer function to distinguish among the concepts to be mapped. This function can provide a level of fine-tuned detail on the ratio of the top two ranked local concepts [Alg. 2, line 10]: When the regularizer value is near 1, the algorithm maps a local concept even if its score is very close to the score of the next ranked local concept. On the other hand, a value near 0 can require a significant difference between the scores. The optimal setting of this hyperparameter varies depending on the heterogeneity of the schemas. Systems disclosed herein can render these mappings in the knowledge graph and notify the user about NULL mappings.

At run time, systems disclosed herein can receive a global query and decompose it into a set of separate local queries each one to be executed at a local database. This can be accomplished by a query re-write mechanism, which uses the Metadata Table and replaces each global concept (attribute, table name, etc.) with its mapped concept of each corresponding local schema. The idea of such a global-to-local query decomposer was introduced by architectures, such as Omnibase. Systems disclosed herein can employ string manipulation with dynamic SQL to generate the local queries. After the automatically generated local queries are executed in their corresponding databases, the partial results can be combined (typically via a UNION or a JOIN operation) and presented to the global user. The required modules for the run time are a global-to-local query decomposer and a query execution scheduler.

Several experiments were conducted to automatically derive global-to-local mappings between two local and one global schema. The results were compared with ground truth mappings, which were generated by domain experts.

Dataset: Two different schemas managing logistic systems were developed independently by two experts who created a ground truth baseline by mapping the local schemas to a global schema. The schema experts' mappings were stored in a Ground Truth Metadata Table. Input to systems disclosed herein are three XML-DDLs, namely, the two logistic schemas (1 & 2) as the two local schemas and a global expert layer (3) used as the global schema. FIG. 4 represents a knowledge graph of the global and the two local schemas and their automated mappings.

Results: The highest local concept mapper objective function of Inteplato was executed on several schema mapping experiments with different configurations for synonym retrieval and hyperparameter value settings as described herein.

FIG. 5 gives an overview of the accuracy of example mappings generated by systems disclosed herein in comparison to the experts' mappings. Local schema (1) has four tables, and 21 attributes, local schema (2) has six tables and 47 attributes, and global schema (3) has four tables and 35 attributes. Since both local schemas were developed independently, they present data type, labeling, structure, value representation, domain, and integrity conflicts. The global schema (3) was created to represent the majority of information given both local schemas. In the expert mapping, each of the 39 global to local concept mappings existed for local schema (2), while local schema (1) contained only 25 corresponding concepts. Accuracy was measured by comparing the Metadata Table generated by systems disclosed herein with the Ground Truth Metadata Table derived by experts. Currently, the objective function of systems disclosed herein maps only single concepts without generating any transformation rules. To overcome this, one table and one attribute transformation rules were inserted for local schema (2) by the experts. The results show that the use of synonyms increases the mapping accuracy for both local schemas by roughly 15% compared to just similarity.

The highest accuracy of 81.90% was obtained with synonym retrieval and the default setting of the hyperparameter (=1). In every experiment, systems disclosed herein mapped at least one of the concepts in the global to local transformation rules developed by the experts. Nonetheless, no credit was given for partially correct mappings. The elapsed time for the automated mapping of the global to both local schemas took less than five seconds for each experiment.

In experiments, systems disclosed herein were implemented in HTML and JavaScript and were approximately 10 MB. For testing, systems disclosed herein were run on GOOGLE CHROME® and MICROSOFT EDGE® browsers using an INTEL® Core i5 9300H processor, 16 GB of RAM, and 256 GB of SSD.

Other aspects of the systems disclosed herein relate to entity linkage (EL). Entity linkage is a core discipline in entity resolution (ER) and data management, especially when dealing with integration tasks. Entity linkage can involve identifying and linking records or data points that refer to the same real-world entity across different data sources or within a single data source. Further, entity linkage aims to determine whether multiple data entries or records correspond to the same entity, such as a person, organization, product, event, or location. It is evident that linking entities between more than two data sources results in a significantly higher degree of heterogeneity and variance in data quality. This issue has been defined as "multi-sourced" ER in which arbitrary numbers of sources and respective entity profiles refer to the same real-world object. An entity profile ei may be an attribute of a relational database schema "product id" or API service "product code" representing the real-world entity r "product identifier". The set of all entity profiles within one data source denotes as an entity collection $E_i$, e.g., E1="Order Customer-Oracle". EL solutions can pass the raw entity collections of all entity profiles from one module to another, resulting in linkages that may not always reflect reality. In addition, there is a lot of computational power to be used for such inaccurate linkages. In order to solve this problem, we introduce scoping, a new phase in the EL pipeline that ranks entities and generates a subset E' of the raw entity collections E while leaving intact the major set of true linkages.

As an example, FIG. 6 depicts an excerpt of a multi-sourced Entity Linkage problem between three entity collections sampled from three schemas of database vendors Oracle (E1), MySQL (E2), and SAP HANA (E3), storing data about customers and products. Each entity collection contains different entity profiles representing relational attributes ei. The brute-force approach of comparing each entity from one collection with all entities from the other collections results in 180 comparisons. Systems disclosed herein provide a solution to the problem of needing to reduce the number of comparisons by identifying a subset of the entity collections containing fewer unlinkable entities while keeping those with true linkages. This feature of the presently disclosed subject matter is referred to as "scoping". The function of scoping as disclosed herein reduces the space of potential linkages in multi-sourced ER. Scoping can be performed between the signature and blocking phases of the EL pipeline. Scoping can include the steps of ranking, sorting, and filtering the data quality of entity signatures. It is an integral phase of multi-sourced ER that can yield streamlined entity collections. Following the Big Data Vs, we assume that the number of entity collections rises in "Volume" and comes along with "Veracity". Therefore, the more entity collections need to be linked between them, the more entities without corresponding linkage may also remain at the end of the EL process. For example, as the entity collections become larger due to the rise in Volume, it has been observed that there is an increase in heterogeneity and a decrease in Veracity. FIG. 7 illustrates the increasing heterogeneity represented by the colored entity collections represented as ovals with unlinkable entities, while the linked ones are shown in the white overlapping oval. Scoping seeks entities with linkages represented in the overlapping oval.

In accordance with embodiments of the presently disclosed subject matter, an ER workflow can include various phases or steps that include, but are not limited to, a signature phase, a scoping phase, a blocking phase, and a filtering phase. The scoping phase is a part of entity linkage and can improve the quality of the search space of pair candidates.

In the signature phase, a numerical embedding strategy can be applied to all entity profiles. The vectorization of an entity profile, such as an attribute in a relational database named "customer address" can be based on tf-idf, the aggregation of pre-trained Word2Vec embeddings, such as Glove or FastText. Further techniques can combine words via sequence modeling, transformers, and self-supervised models.

The blocking phase can generate a set of likely matching entity profiles into buckets. This phase may incorporate any further knowledge infusion except query tokens that vary with hyperparameter settings such as the size of the buckets and parallelization settings on hardware. Respective algorithms use dimensionality reduction techniques (PCA, t-SNE) to reduce the signature length. Then, nearest-neighbor algorithms (ENNs such as Hierarchical Clustering, K-Means, DBSCAN) or approximate nearest-neighbor algorithms using hash indexing methods (ANNs such as LSH with FAISS or SCANN implementation) can be applied to generate buckets of similar entities.

The filtering phase can construct a set of verified linkages of matching entity profiles. This phase examines every inter-bucket pair and filters out unwanted linkages whose similarity is below a similarity threshold while keeping those that exceed the threshold. Filtering is optional and applies to the Cartesian set between entities within a blocking-generated bucket.

In accordance with embodiments, scoping can combine a ranking algorithm with a tunable threshold for generating streamlined entity collections. The technique of scoping can be applied to a schema-aware, multi-sourced and unsupervised entity linkage environment. An overview of notations referred to herein are provided in Table III below.

TABLE III

| Notation | Meaning |
| --- | --- |
| $e_i$ | Entity Profile |
| $E_{source} = (e_1, e_{...}, e_n)$ | Entity Collection |
| $(e_{E1} \equiv e_{E...} (\equiv e_n) \Rightarrow r)$ | Real-world Entity |
| $E = E_1 \cup E_{...} \cup E_n$ | Unified Entity Collection |
| $V(E) = (v_i)$ | Entity Signature |
| $R(V(E)) = (e_i, s_i)$ | Entity Ranking (score-tuple) |
| $S((e_i, s_i), p) = \{(e_i, s_i): \forall s_i < s_{i+1} \wedge |e_i, s_i| \times p\} = E'$ | Entity Scoping (threshold) |
| $B(E) = \{(e_a, e_b): e_a \in E_i \wedge e_b \in E_j\}$ where $E_i, E_j \in E$ | Entity Blocking (brute-force) |
| $L(E) = \{(e_a, a_b): e_a \in E_i \wedge e_b \in E_j, e_a \equiv e_b \Rightarrow r\}$ where $E_i, E_j \in E$ | Entity Linkage |

In entity linkage, it is aimed to find the set of linked entity profiles in which entities share the same real-world entity representation $L(E) = \{(e_a, e_b): e_a \in E_i$ and $e_b \in E_j$ so that $e_a = e_b \Rightarrow r\}$ where $E_i, E_j \in E$ between entity collections. Scoping utilizes the entity signatures vi, the previously vectorized entity profiles processed by the Entity Signature phase V(E). Before applying the actual scoping method, an Entity Ranking algorithm R(V(E)) computes an entity score for each entity signature, returning the tuple $(e_i, s_i)$ where $s_i$ is the score of entity profile $e_i$. The ranking algorithms disclosed herein categorize entity profiles with lower scores as linkable and higher scores as unlinkable in comparison to each other. The actual scoping algorithm S, first, sorts the entity score tuples $(e_i, s_i)$ in descending order so that $s_i < s_i + 1$. Secondly, the algorithm filters the entity score tuples to identify and prioritize top-ranked entities with lower scores. A single configurable threshold $p \in [0,1]$ is provided for the scoping algorithm that represents a radius (e.g., white overlapping space in FIG. 7) for selecting linkable entities depending on the scores. The output of scoping generates a new subset $E' \subseteq E$ with fewer entity profiles selected from the original entity collection. Subsequently, blocking the entity profiles across E' instead of E results in higher quality entity pair candidates, resulting in less computational resources (space and time). Scoping generally differs in comparison to blocking in the sense that it aims to generate a subset entity collection $E' \in E$ without compromising the set of linkages $L(E') = L(E)$ regardless of the blocking sequence.

Referring to FIG. 6, this figure shows the effect of scoping on the original collection, in which a ranking algorithm computes a score for each entity and scopes 11 out of the 17 top-scored entities (p=0.65). Unlinkable entities like "phone" and "country id" are omitted. With the scoped collections, it goes down from 180 to 48 potential linkages without missing a single true linkage.

In embodiments, the ranking methods R(V(E)) process uses the entity signatures to compute an entity score tuple $(e_i, s_i)$ used to scope a relative portion of E based on p in order to generate a subset of entity collections E'. It is noted that the size of the data input in scoping is linear in the number of entity profiles $|E_1| + |E \ldots | + |E_n|$ and not the Cartesian product (brute force) between all possible entity pairs between entity collections $|E_1| \times |E \ldots | \times |E_n|$. As disclosed herein, two modified outlier algorithms can be used to compute anomaly scores vi for each entity signature. Also, encoder-decoder-based anomaly detection algorithms as disclosed herein can be utilized.

In embodiments, a "Z-Score" is utilized as a statistical measure to quantify the entity's degree of dispersion. Its anomaly score implies how many standard deviations σ an entity signature differs from the mean u of all entity signatures $(e_i, s_i) = ||(vi - \mu)/\sigma||$. The Z-Score can be computed per dimension of the entity signature and results in positive and negative floating values. Subsequently, the mean of the absolute (positive) dimension-based Z-scores along with the entity signature represents the entity score. The time complexity for computing the Z-scores is $O(|E \cdot v)$.

Another technique used in accordance with embodiments disclosed herein involves Local Outlier Factor (LOF), which is a density-based method that quantifies the local deviation of a data point from its neighborhood. The locality of the anomaly score depends on the degree of isolation (e.g., Euclidean or Cosine) between the entity signature and the surrounding entity signatures given by k-nearest neighbors. By comparing the local distances of one entity's signature to the local densities of its surroundings, those with substantially lower densities are considered to be outliers. It is noted that LOF requires k as a hyperparameter input representing the number of neighborhoods. The value of k directs the number of global linkages between entities and, therefore, highly influences the local density scores. The time complexity for computing the LOF is $O(|E| \cdot \bar{v} \cdot k)$.

Another technique used in accordance with embodiments disclosed herein involves Encoder-Decoder. In embodiments, self-supervised encoder-decoder models can be utilized to implement scoping. Once an encoder-decoder model is trained, frequent entities that are similar and appear to exhibit linkages pass the autoencoder with a lower reconstruction error. The reason for this is a bottleneck that appears in encoder-decoder algorithms, forcing the model to focus on recurring entities during the training rather than on rare anomalous ones. This criterion can be used for identifying entities with a high reconstruction error as entities out of the linkage bound. To leverage an entity score of these methods for the scoping framework, a wrapped-up agent computes the mean squared error between the original and decoded entity signatures. This functionality is depicted in FIG. 9 and translate this model to an EL agent, as it provides feedback on the adaptability of entities for the linkage task based on a low or high reconstruction error. Additionally, the model of agents can be reused to rank entities of newly adapted collections. The benefit of using a trained model is that a holistic recomputation, such as needed for the Z-Score or LOF method, might not always be necessary. This approach can improve efficiency and save resources via task transferability in EL pipelines.

Another technique used in accordance with embodiments disclosed herein involves Principal Component Analysis (PCA). Applying PCA onto the entity signatures transforms them into a lower-dimensional space. The reduced space can also capture relevant patterns. Each principal component in PCA quantifies the importance of the disparity of entities along its dimension based on linear hyperplanes. This can be useful, as the signatures of unlinkable entities may exhibit unique patterns in high dimensional space. PCA can be reused for scoping new entity collections by applying the model and comparing the mean squared error. An example PCA algorithm for scoping follows:

---

Algorithm 1: Entity Ranking R with PCA

Data: V(E) = (v$_i$) Entity Signatures
Result: R(V(E)) = (e$_i$, s$_i$) Entity Scores
X = scaler(0,1).fit{(v$_i$));
μ = mean(X);
//along dimensions;
Pca = sklearn.PCA(nc).fit(X);
//singular value decomposition;
Z = pca.transform(X);
$\hat{X}$ = (Z•pca.components) + μ;
return (s$_i$) ⇐ MSE(X,$\hat{X}$);

---

The first line casts an optional [0 . . . 1] normalization along the entity signature dimensions, transforming the set of entity signatures (v$_i$) to the input data set X. As entity signatures contain both negative and positive values along the dimensions, normalization simplifies the subsequent mean and similarity calculations. X is a |E|×v̄ matrix in which |E| represents the number of entities of a collection and v̄ represents the dimensional length of the entity signature. In the second step, the μ vector of the mean was computed along each dimension. Thirdly, PCA is initialized with the number of components given by the hyperparameter nc, subtract μ from each (normalized) vector signature X, and compute the singular value decomposition for each principal component with the same vector length as v. Subsequently, the input data set X can be projected onto the lower-dimensional principal components, resulting in the encoded |E| X nc matrix we define as Z. Subsequently, the decoder operation can be casted to generate $\hat{X}$. This involves reversing the dot-product between Z and principal components plus the entity-wise addition of the mean u. Subsequently, the mean-squared error (MSE) between X and $\hat{X}$ was computed and utilized as the entity scores (s$_i$). The time complexity for PCA is O(|E| ·v̄$^2$+v̄$^3$).

Autoencoders can be implemented as a feature of the presently disclosed subject matter. Autoencoders are a special type of neural networks trained to encode data on a meaningful representation and reversely decode it back to its original state. These models are considered self-supervised as the data serves both as training input and output. Similar to PCA, the assumption is that a trained autoencoder learns relevant patterns more efficiently of normally distributed entity signatures but not for anomalous and unlinkable ones. Moreover, autoencoders with one latent layer and linear activation functions generalize PCA. Disclosed in the following, a summary of autoencoders is provided in the context of anomaly detection using the reconstruction error for scoping.

The encoder function is denoted as A(V(E)=X)⇒Z mapping the set of the normalized entity signatures into a latent lower-dimensional representation. The decoder function B(Z)⇒$\hat{X}$ aims to transform the latent representation into the original input. Both the functions of A and B are trained over a number of epochs ep in order to minimize the mean reconstruction error converging to arg min$_{A,B}$[MSE(X, B(A (X)))]$_{ep}$.

Contrary to PCA, normalization of the entity signatures not only simplifies the computation but allows the use of non-linear activation functions. Both the encoder and decoder functions can, therefore, construct more elegant and superior non-linear hyperplanes. At the same time, non-linear hyperplanes tend to overfit. For this reason, different types of regularization beyond the lower-dimensional bottleneck must be considered depending on the number of entities |E|, signature length v̄, and degree of deviations. Various possible configurations of the autoencoder may consider the network's depth or shallowness, the number of epochs, layers, neurons, activation functions, optimization algorithms, loss, and validation sampling configurations. The computational time complexity depends on those architectural choices; therefore, providing a O( ) notation varies and is dependent on each different configuration. Due to the rising time complexity of backpropagating the weights of each neuron in each hidden layer over multiple epochs, it is assumed that autoencoders to have a higher time complexity compared to the previously presented ranking methods. In the scoping context, it is generally recommended to prevent overfitting with regularization, as such a model can generate identical entity scores that may not be useful for scoping.

In experiments, the scoping approach was applied to a real-world multi-sourced entity linkage dataset. Experiments were performed in Python Jupyter hosted by Google CollaboratoryI. Regarding performance metrics, to measure the effectiveness of the algorithms for generating scoped entity collections E' from the original ones E, we adopt typical metrics used in ER.

Reduction Ratio (RR(E', E)) reflects the time efficiency in scoping without relevance to the ground truth of linkages. It expresses the reduction in the number of entity comparisons between the scoped entity collections and the original ones:

$$1 - \|B(E'_1, E' \dots , E'_n)\| / \|B(E_1, E \dots , E_n)\|.$$

Pair Completeness (PC(E', E)) estimates the number of potentially true entity linkages within the scoped entity collections with respect to the number of the ground truth entity linkages within the original entity collections:

$$\|L(E'_1, E' \dots, E'_n)\| / \|L(E_1, E \dots, E_n)\|.$$

Harmonic-Mean RR-PC (HM(E', E))) represents a combined metric between the two competing objectives of reduction ratio and pair completeness. 2·RR·PC/RR+ PC.

The threshold p affects the collections of scoped entities E' in a major way. Knowing its value beforehand implies knowing the ground truth of entity linkages. p can be adjusted as an engineering task aiming to yield better performance by introducing two new metrics using the Area Under Curve and comparing them.

Area Under Curve PC APC(E', E) evaluates the entity scoring utility in scoping. The more entity pairs that are correctly found with increasing p, the higher the single valued APC metric. A higher APC for one ranking method allows more confidence in lowering the p threshold without time considerations.

Area Under Curve HM AHM(E', E) helps to quantify the trade-off between the reduction ratio and pair complete-ness across all p thresholds. A higher AHM recom-mends a more robust scoping approach considering both the pair completeness and time efficiency.

Schemas and Experiments: The datasets contained only schema information from Oracle, MySQL, and SAP HANA, without instance data. First, a set of experiments were performed on a domain specific set of order-customer (OC) schemas with 47 true inter-schema attribute linkages out of 6617 attribute-pair candidates. Then, the same experiments were conducted on a domain-agnostic set of schemas by extending the domain-specific schemas with a human resources (HR) schema. 15 additional inter-schema attribute pairs were annotated since the OCMySQL schema contains attribute linkages between employees and offices. Conse-quently, the domain agnostic setting contains 11587 attribute pair candidates, of which 62 are considered true. A detailed summary of the dataset is shown in Table IV.

TABLE IV

| Entity Collections ($E_A$ – $E_B$) | #Tables | #Attributes | $|E_A| \times |E_B|$ | #Attribute Linkages |
|---|---|---|---|---|
| Domain-specific $\Sigma^{OC3}$ | 18 | 142 | 6617 | 47 |
| OC-Oracle – OC-MySQL | 15 (7 + 8) | 102 (43 + 59) | 2537 | 19 |
| OC-Oracle – OC-HANA | 10 (7 + 3) | 83 (43 + 40) | 1720 | 16 |
| OC-MySQL – OC-HANA | 11 (8 + 3) | 99 (59 + 40) | 2360 | 12 |
| Domain-agnostic $\Sigma^{OC3}$-HR | 25 | 177 | 11587 | 62 |
| HR-Oracle – OC-Oracle | 14 (7 + 7) | 78 (35 + 43) | 1505 | 0 |
| HR-Oracle – OC-MySQL | 15 (7 + 8) | 94 (35 + 59) | 2065 | 14 |
| HR-Oracle – OC-HANA | 10 (7 + 3) | 75 (35 + 40) | 1400 | 1 |

The textual descriptions of each entity were preprocessed across all collections by concatenating the table and attribute names, splitting concatenated words, and removing repeti-tive words. Based on a comparative analysis, static Glove embeddings trained on Common Crawl without out-of-vocabulary vector retrievals were aggregated.

The following configurations were utilized for the ranking methods:

Z-Score: The default implementation of the SciPy2 library was used.

LOF: The sklearn neighbors library3 was imported, and the number of neighbors k=15 specified as these are the average number of linkages between the entity collec-tions.

PCA: The Lapack SVD implementation of the sklearn decomposition library[3] was used, and nc=2 (number of principal components) was used as a small size of |E| was dealt with.

AE: We use the Keras library and configure an autoen-coder with three intermediate layers to extend the network complexity to PCA. We use rectified linear units (ReLUs), Adam as the optimizer, the mean squared error (MSE) as the loss function, and a shuffled test-train split of 20%. To prevent identity functions, the small size of ten epochs (fixed early stopping) were defined, but the model was initialized ten times and each entity's MSE summed up to stabilize the final entity score.

Ensemble: The mean score was takne across the normal-ized entity score tuples ($e_i$, $s_i$) of the best performing configurations of Z-Score, LOF, PCA, and AE based on APC, AHMB, and AHMF. In this regard, an equally weighted ensemble of entity scores works similarly to a random forest (supervised) or consensus clustering (unsupervised).

Blocking: Blocking primarily affects the time reduction ratio, while scoping affects the completeness of entity link-age pairs. To show this distinction, two blocking modules were employed: the first is a simplistic entity blocking module B that schedules all potential inter-source-linkages (Cartesian product) between the (scoped) entity collections at point p. The second one is the efficient locality-sensitive hashing-based similarity search blocking module F imple-mented with the Python package. This blocking scheme queries each entity signature and outputs a maximum of k=50 linkage candidates based on the L2-distanced nearest neighbors.

The scoping approach was evaluated on the OC3-HR dataset. The AUC metrics for the pair completeness (APC) and the harmonic mean for the brute force (AHMB) and FAISS-based (AHMF) blocking modules are provided. The results are based on the entity signature V, ranking method R, and parameter configurations summarized in Table V. The best result per ranking method is highlighted in bold. FIGS. 10 and 11 plot the best performing stand-alone and ensemble configurations for APC and AHM with the performance (y-axis) of the time reduction ratio, pair completeness, and the harmonic mean on the increasing relative threshold parameter p (x-axis). Particularly, FIG. 10 shows RR, PC, and HM performance on domain-specific OC3 dataset (left: AE with gtrt5, and right with ensemble). Also, FIG. 11 shows RR, PC, and HM performance on domain-agnostic OC3-HR dataset (left: LOF with gtrt5, and right with ensemble) Generally, Sentence Transformer Bert (gtrt5) signatures outperform word2vec (Glove) with minor excep-tions for the Z-Score method. It is worth noting that two blocking methods were compared and showed that the FAISS-based one improved in computational time reflected in AHMF. However, none of them had any effect on the number of true linkages as measured in APC. In these experiments, the best-performing stand-alone model for APC and AHM is the autoencoder with gtrt5 signatures. The 2.25% domain-specific APC improvement for autoencoders with the ensembling training nature: autoencoders' com-pression and decompression functions are trained over mul-tiple epochs with a shuffled train-test split of entity signa-tures.

FIG. 12 illustrates a block diagram of an example system 1200 for organizing data of a plurality of different databases 1202A-1202N having different local data schemas in accor-dance with embodiments of the present disclosure. The system 1200 in this example is described as including a computing device 1204 and the databases 1202A-1202N being connected by communications network(s) 1206, but it should be understood that the system may alternatively be implemented by any other suitable computing system.

Referring to FIG. 12, the computing device 1204 can include a database manager 1208 for implementing the functionalities for organization of data from multiple sources of differing schemas as disclosed herein. The data-base manager 1208 can be implemented by any suitable hardware, software, firmware, or combinations thereof. In this example, the database manager 1208 is implemented by memory 1210 and one or more processors 1212. The memory 1210 may store instructions that are implemented by the processor(s) 1212.

Further, the computing device 1204 may be operatively connected to a user interface 1214. The user interface 1214 may include, but is not limited to, a display, a keyboard, a mouse, and/or other components for interaction with a user. The user may utilize the user interface 1214 for entering a search query and for sorting through and/or organizing results of the search query. The results of the search query may be presented to the user via the user interface 1214, such as by a display.

The network(s) 1206 can include the Internet, local area network, cellular networks, and other for enabling communication between the computing device 1204 and other electronic equipment such as, but not limited to, databases 1202A-1202N. The computing device 1204 can include a communications module 1216 that can operatively communicate with the network(s) 1206. The database manager 1208 can control the communications module 1216 to send queries to databases 1202A-1202N. Als, communications module 1216 can receive query search results and other information from the databases 1202A-1202N. Databases 1202A-1202N can be managed individually managed by one or more computing devices, such as servers (not shown for case of illustration).

FIG. 13 illustrates a flow diagram of an example method for organizing data of different schemas and for utilizing the organized data in accordance with embodiments of the present disclosure. The method of FIG. 13 is described as being implemented by the system 1200 of FIG. 12, but it should be appreciated that the method may be implemented by any other suitable system.

Referring to FIG. 13, the method includes determining 1300 a concept for a global data schema for stored data. For example, the database manager 1208 can determine a global data schema for use in organizing the data of databases 1202A-1202N. In one example, the global concept may be "Customers". In this example, database 1202A may include a table "Customer" in one schema, while database 1202B includes a table "Client" in another schema.

The method of FIG. 13 includes determining 1302 concepts for multiple local data schemas for the stored data. Continuing the aforementioned example, database manager 1208 may access databases 1202A and 1202B via network(s) 1206 to determine that "Customer" is a table in database 1202A and that "Client" is a table in database 1202B.

The method of FIG. 13 includes analyzing 1304 the concept for the global data schema and the concepts for the local data schemas to determine similarity scores for the concepts of the local data schemas with respect to the concept of the global data schema. Continuing the aforementioned example, database manager 1208 can determine similarity scores for the concepts of local data schemas of databases 1202A and 1202B. These similarity scores may be determined by use of, but not limited to, fuzzy string analysis, synonym intersection analysis, data type analysis, constraint similarity analysis, and/or the like.

The method of FIG. 13 includes mapping 1306 the concepts of the local data schemas to the concept of the global data schema based on the determined similarity scores. Continuing the aforementioned example, the database manager 1208 can may the local concepts of "Customer" and "Client" to "the global concept of "Customers". The database manager 1208 can automatically derive mappings between tables and between attributes of the schemas of databases 1202A and 1202B. In addition, the database manager 1208 can store these mappings in memory 1210. As a result, the method of FIG. 13 includes associating 1308 data within the at least one database based on the map for use in accessing related data. For example, the stored mapping to the local schemas of databases 1202A and 1202B can be used to generate local queries to be communicated to the databases 1202A and 1202B for execution, collection of local results, processing, and delivering the resulting search data to the user via the user interface 1214.

The method of FIG. 13 includes receiving 1310 a data access query identifying a search parameter. Continuing the aforementioned example, a user utilizing the user interface 1214 shown in FIG. 1 can input a search query that identifies a search parameter either directly or indirectly. As an example, the search parameter may include a parameter "Customers", which is a global concept mapped to local schemas of databased 1202A and 1202B.

The method of FIG. 13 includes using 1312 the map to determine whether data associated with the search parameter is stored at one or both of local databases. Continuing the aforementioned example, the global concept "Customers" is mapped to both the "Customer" and "Client" tables stored in databases 1202A and 1202B, respectively. Subsequently, the method of FIG. 13 includes communicating 1314 data access queries to databases based on the determination that the data associated with the user's search parameter is stored at the databases. Continuing the example, search queries can be sent to databases 1202A and 1202B based on the mapping of the global concept "Customers" is mapped to both the "Customer" and "Client" tables stored in databases 1202A and 1202B, respectively.

FIG. 14 illustrates a flow diagram of another example method for organizing data of different schemas and for utilizing the organized data in accordance with embodiments of the present disclosure. The method of FIG. 14 is described as being implemented by the system 1200 of FIG. 12, but it should be appreciated that the method may be implemented by any other suitable system.

Referring to FIG. 14, the method includes determining 1400 signatures of the databases based on the local data schemas for a search parameter. As an example, the database manager 1208 can analyze all entities and associate a signature that identifies each entity. The textual descriptions of each entity across all collections can be preprocessed by concatenating the table and attribute names, splitting concatenated words, and removing repetitive words.

The method of FIG. 14 includes ranking 1402 the databases based on the determined signatures. Continuing the aforementioned example, a Z-score, LOF, PCA, AE, and ensemble technique as described herein can be utilized. The method of FIG. 14 includes determining 1404 a subset of the databases for search based on the ranking of the databases. In the example, a blocking technique as described herein may be utilized to determine one or more of the databases to exclude. Others may be permitted in a search.

The method of FIG. 14 includes receiving 1406 a search query associated with the search parameter. Continuing the aforementioned example, a user utilizing the user interface 1214 shown in FIG. 1 can input a search query that identifies a search parameter either directly or indirectly. As an example, the search parameter may include a parameter "Customers", which is a global concept mapped to local schemas of databased 1202A and 1202B.

The method of FIG. 14 includes searching 1406 the subset of databases in response to receipt of the search query that is associated with the search parameter. Continuing the aforementioned example, the databases 1202A and 1202B can be searched by communications initiated from the database manager 1208.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a server or other computer located within a retail environment and communicatively connected to other computing devices (e.g., POS equipment or computers) for managing accounting, purchase transactions, and other processes within the retail environment. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, an iPAD® device, smart watch, or the like) that is capable of sending and receiving data in a wireless manner using protocols like the Internet Protocol, or IP, and the wireless application protocol, or WAP. This allows users to access information via wireless devices, such as smart watches, smart phones, mobile phones, pagers, two-way radios, communicators, and the like. Wireless data access is supported by many wireless networks, including, but not limited to, Bluetooth, Near Field Communication, CDPD, CDMA, GSM, PDC, PHS, TDMA, FLEX, REFLEX, iDEN, TETRA, DECT, DataTAC, Mobitex, EDGE and other 2G, 3G, 4G, 5G, and LTE technologies, and it operates with many handheld device operating systems, such as EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone or smart watch that operates over GPRS (General Packet Radio Services), which is a data technology for GSM networks or operates over Near Field Communication e.g. Bluetooth. In addition to a conventional voice communication, a given mobile device can communicate with another such device via many different types of message transfer techniques, including Bluetooth, Near Field Communication, SMS (short message service), enhanced SMS (EMS), multi-media message (MMS), email WAP, paging, or other known or later-developed wireless data formats. Although many of the examples provided herein are implemented on smart phones, the examples may similarly be implemented on any suitable computing device, such as a computer.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A system for identifying linkages among entities, the system comprising:
   a computing device including an entity linkage manager configured to:
      analyze a concept for data schemas to determine similarity scores for entities of local data schemas with respect to entities of a global data schema;

determine similarity scores for the entities of the local data schemas;
   select the entities that are linkable based on the determined similarity scores for the entities of the local data schemas;
   block profiles of some of the entities of the local data schemas based on the similarity scores;
   generate and store a map of the entities of the local data schemas to the entities of the global data schema based on the selected entities that are linkable and blocked profiles of some of the entities of the local data schemas;
   associate data within at least one database based on the map for use in accessing related data;
   receive, from a user interface, a search query that identifies a search parameter associated with the concept;
   use the map to determine that data associated with the search parameter is stored at one of the entities of the local data schemas and the global data schema;
   send the search parameter to the one of the entities in response to the determination that that data associated with the search parameter is stored at one of the entities of the local data schemas and the global data schema;
   receive, from the one of the entities, a result of sending the search parameter to the one of the entities; and
   present the result via the user interface.

2. The system of claim 1, wherein the entity linkage manager is configured to determine the similarity scores for the entities of the local data schemas by utilization of fuzzy string analysis, synonym intersection analysis, data type analysis, and/or constraint similarity analysis.

3. The system of claim 2, wherein the entity linkage manager is configured to rank the entities based on the determined similarity scores.

4. The system of claim 3, wherein the entity linkage manager is configured to sort and filter the determined similarity scores for identifying top-ranked entities with low scores.

5. The system of claim 4, wherein the entity linkage manager is configured to sort and filter the determined similarity scores based on a configurable threshold.

6. The system of claim 4, wherein the entity linkage manager is configured to block profiles of some of the entities based on the configurable threshold.

7. The system of claim 1, wherein the entity linkage manager is configured to determine the similarity scores for the entities by quantifying each entity's degree of dispersion.

8. The system of claim 1, wherein the entity linkage manager is configured to determine the similarity scores for the entities by quantifying local deviations of entity signatures from surrounding entity signatures.

9. A method for identifying linkages among entities, the method comprising:
   at a computing device:
   analyzing a concept for data schemas to determine similarity scores for entities of local data schemas with respect to entities of a global data schema;
   determining similarity scores for the entities of the local data schemas;
   selecting the entities that are linkable based on the determined similarity scores for the entities of the local data schemas;
   blocking profiles of some of the entities of the local data schemas based on the similarity scores;

generating and storing a map of the entities of the local data schemas to the entities of the global data schema based on the selected entities that are linkable and blocked profiles of some of the entities of the local data schemas;

associating data within at least one database based on the mapping for use in accessing related data;

receiving, from a user interface, a search query that identifies a search parameter associated with the concept;

using the map to determine that data associated with the search parameter is stored at one of the entities of the local data schemas and the global data schema;

sending the search parameter to the one of the entities in response to the determination that that data associated with the search parameter is stored at one of the entities of the local data schemas and the global data schema;

receiving, from the one of the entities, a result of sending the search parameter to the one of the entities; and presenting the result via the user interface.

10. The method of claim 9, further comprising determining the similarity scores for the entities of the local data schemas by utilization of fuzzy string analysis, synonym intersection analysis, data type analysis, and/or constraint similarity analysis.

11. The method of claim 10, further comprising ranking the entities based on the determined similarity scores.

12. The method of claim 11, further comprising sorting and filtering the determined similarity scores for identifying top-ranked entities with low scores.

13. The method of claim 12, further comprising sorting and filtering the determined similarity scores based on a configurable threshold.

14. The method of claim 12, further comprising blocking profiles of some of the entities based on the configurable threshold.

15. The method of claim 9, further comprising determining the similarity scores for the entities by quantifying each entity's degree of dispersion.

16. The method of claim 9, further comprising determining the similarity scores for the entities by quantifying local deviations of entity signatures from surrounding entity signatures.

\* \* \* \* \*